F. BOYD.
PRESSURE REGULATOR FOR GAS LINES.
APPLICATION FILED APR. 18, 1914.
1,174,661. Patented Mar. 7, 1916.
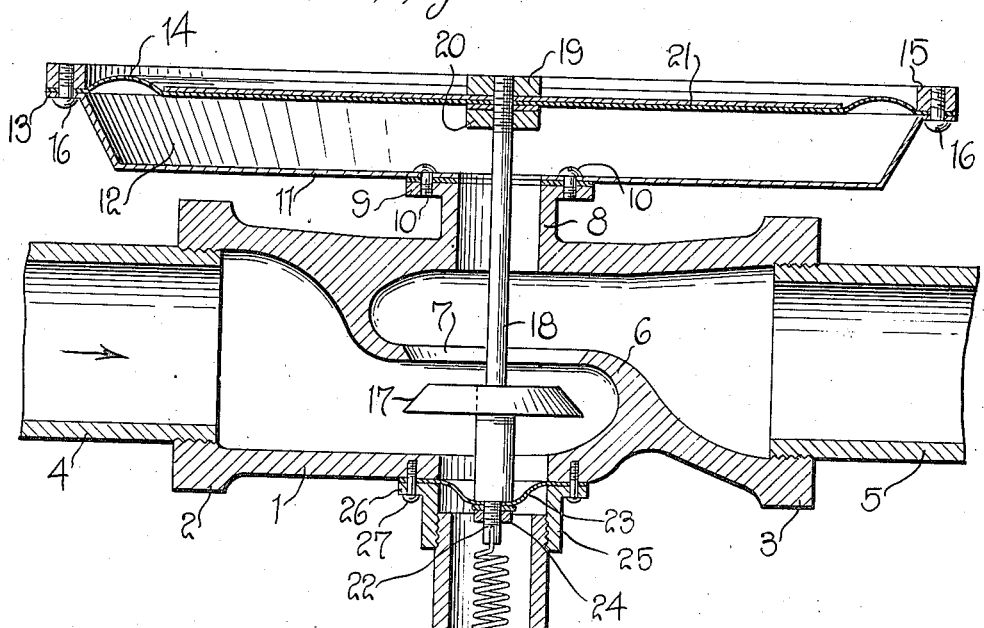
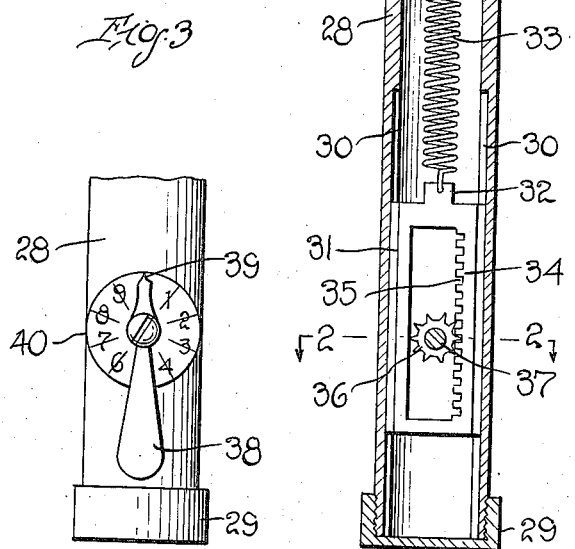
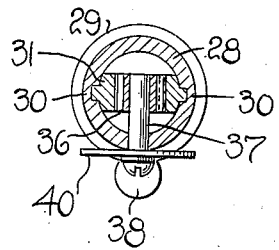
Inventor
F. BOYD.
Witnesses
Robert M. Sulphen
A. I. Hirt
By Watson E. Coleman
Attorney

UNITED STATES PATENT OFFICE.

FRED BOYD, OF ATLANTA, GEORGIA.

PRESSURE-REGULATOR FOR GAS-LINES.

1,174,661. Specification of Letters Patent. Patented Mar. 7, 1916.

Application filed April 18, 1914. Serial No. 832,847.

*To all whom it may concern:*

Be it known that I, FRED BOYD, a citizen of the United States, residing at Atlanta, in the county of Fulton and State of Georgia, have invented certain new and useful Improvements in Pressure-Regulators for Gas-Lines, of which the following is a specification, reference being had to the accompanying drawings.

This invention relates to pressure regulators for gas lines.

The object of the invention is in a ready, practical and certain manner, to regulate the pressure of gas at the point of consumption in such manner that no matter what the feed pressure is or how irregular it may be, the apparatus will maintain a constant pressure at the point of consumption.

With the above and other objects in view, as will appear as the nature of the invention is better understood, the same consists, generally stated, in a pressure regulator for gas lines embodying a casing having intermediate of its ends a valve seat, one end of the casing being connected with the inlet gas pipe and the other end with the outlet pipe.

Arranged within the casing is a valve, disposed to coact with the valve seat, and connected with the valve is a stem, the upper end of which is connected with a flexible diaphragm constituting a closure for a gas receiving chamber, and the lower end of which is connected with a second diaphragm which serves as a closure between the valve chamber and a tubular extension having housed therein tension regulating means for the diaphragm of the gas receiving chamber. The operation of the device is such that when gas is initially admitted to the valve chamber, and passes thence to the gas receiving chamber, it operates upon the diaphragm therein, and lifts the valve stem, thereby causing the valve carried thereby firmly to close the valve port to insure the passage to the outlet of the proper quantity of gas which is determined in advance by adjusting the tension means.

Further and more specific details of construction will be hereinafter fully described and claimed.

In the accompanying drawings forming a part of this specification, and in which like characters of reference designate corresponding parts: Figure 1 is a vertical longitudinal section through a pressure regulator for gas lines constructed in accordance with the present invention; Fig. 2 is a horizontal section taken on line 2—2 of Fig. 1 and looking in the direction of the arrow thereon; Fig. 3 is a view in side elevation of the lower portion of the apparatus exhibiting the means for regulating the tension of the spring connecting with the valve stem.

Referring to the drawing, 1 designates a valve casing having at each end a threaded extension 2 and 3 respectively, with the former of which connects the gas inlet pipe 4 and with the latter the gas outlet pipe 5. Arranged centrally of the casing and in a plane parallel with the longitudinal axis of the casing is a septum 6 having formed therein a valve seat 7. The upper side of the casing is formed with a hollow extension 8 having a lateral circumferential flange 9 to which is secured, by screws 10, the bottom 11 of a circular pan-shaped member 12 constituting a gas receiving chamber, the upper edge of which is turned outwardly to provide a circumferential flange 13 upon which rests the peripheral portion of a flexible diaphragm 14, the same being securely clamped to the flange by an annulus 15 that is firmly clamped against the diaphragm by screws 16 that pass through the flange 13 and diaphragm and are threaded into the annulus. This diaphragm is constructed of any suitable flexible material impervious to the passage of gas, such as sheepskin or soft leather, in order to render it readily responsive to the fluctuating pressure of the gas.

Arranged beneath the valve seat 7 is a conical valve 17 which is threaded upon a stem 18. It will be noted from Fig. 1 that the valve opening 7 or seat has its side walls downwardly and centrally inclined, while the valve 17 has its periphery upwardly and centrally inclined reverse to the inclination of the wall of the opening 7. The purpose of this is to minimize the area of contact between the periphery of the valve 17 and the wall of the valve seat as much as possible, as in this class of valves the gas leaves a sticky or waxy residue upon projecting surfaces, and if the valve has its periphery formed to contact with and seat fully upon the wall of the valve seat then the valve is very liable to get stuck so that considerable force is required in order to detach the valve from its seat. With my improved construction, the valve but rarely touches the seat, but when it does touch it the area of contact is very small and as a consequence the valve will not stick and thus prevent the delicate operation of the mechanism. The stem 18 passes through the valve port 7, extension 8 and bottom 11 of the gas receiving chamber and through the diaphragm, and is provided at its upper end with threads to receive clamping nuts 19 and 20, one of which is disposed above and the other below the diaphragm, the nut 19 serving to hold positioned over the diaphragm a metal disk 21, of less diameter than the diaphragm, and operating to prevent the latter from bulging up in the center.

The lower end of the stem 18 has a threaded extension 22 which projects through a flexible diaphragm 23 of the same character as the diaphragm 14, and is held assembled therewith by a nut 24 screwed on the extension 22. The periphery of the diaphragm 23 is clamped against the under side of the valve casing by an internally threaded socket 25 provided with an outturned flange 26 to receive bolts or screws 27 by which it is secured to the valve casing and clamps the diaphragm in place. Threaded into the socket is the upper end of a tube 28, the lower end of which has threaded on it a cap 29. The lower portion of the inner walls of the tube 28 is provided with diametrically opposed longitudinal grooves 30 that form guide-ways for guides carried by a hollow frame 31, the upper end of which is provided with a lug 32 which is orificed to receive the lower end of a coiled tension spring 33, the upper end of which passes through an orifice in the extension 22 of the valve stem. One member 34 of the frame 31 is provided on its inner edge with rack teeth 35 that are designed to be engaged by a gear 36 carried by the inner end of a stem 37, the outer end of which carries a handle 38 firmly secured to the stem and provided with a pointer 39 which is designed to traverse a graduated dial 40 carried by the lower portion of the tube.

In operation, it having been ascertained what pressure is desired, the handle 38 is manipulated to move the frame 31, thus to place the spring 33 under the required tension. Gas is now admitted to the inlet 4, and passes upward through the valve port and through the extension 8 and bottom of the gas receiving chamber into the latter, and by acting upon the diaphragm 14 will cause the same to rise and thereby impart like movement to the stem 18 whereupon the valve will be brought into such relation with the valve seat as to insure only the passage of an amount of gas through the outlet as will be just sufficient to maintain the desired pressure in the discharge. The pressure may be at any time changed by manipulating the handle 38, as will be apparent.

It is to be noted that the diaphragm chamber 12 opens into the valve casing upon the outlet side of the valve casing, and hence that the diaphragm 21 is subjected entirely to the pressure on the outlet side of the valve casing, and that it is the variations in this pressure which act to flex the diaphragm. If the diaphragm chamber opened into the inlet side of the valve casing the valve would then act as a reducing valve and not as a regulator, and would be affected by variations in pressure of the gas supplied rather than by variations of pressure in the gas consumed. With my mechanism the gas in the outlet pipe 5 and on the outlet side of the chamber may be held at a certain predetermined pressure without regard to the pressure on the inlet side of the valve and without regard to variations in the pressure on the inlet side. This has been shown by actual demonstration of my gas regulator. The purpose of the flexible diaphragm 23 is to prevent gas from passing into the tube 28 and affecting deleteriously the spring 33 as the gas otherwise would do. Furthermore, it is to be noted that the diaphragm 23 supports the lower end of the valve stem and acts, in a sense, as a flexible guide therefor. By this construction, the provision of a spider or like device is obviated, which spider, if it were used, would collect sticky or waxy residue formed by the passing gas and cause the valve to stick or move unevenly. The diaphragm 23, it will be seen, is of a diameter smaller than the diameter of the valve 17, and the area of the diaphragm, which is submitted to the pressure of the gas, is rendered still smaller by the relatively large diameter of the stem depending from the valve 17. Thus the diaphragm 23 is practically negligible as far as the movement of the valve 17 is concerned, and entirely negligible in counteracting the free movement of the diaphragm 21. It will therefore be seen that the valve is actuated entirely by the pressure on the outlet side of the valve casing, and is not acted upon by the pressure on the inlet side. The valve casing is a stock valve casing wherein the valve is originally disposed above or on the upper side of the septum 6, the valve stem passing through the opening 8 and it will be seen that because of my construction I can utilize stock forms of valves, merely applying a diaphragm chamber thereto and engaging the tube 28 therewith by means of the collar 25, at the same time, of course, reversing the valve, as before stated.

From the foregoing description it will be seen that although the improvements herein described are simple in character, they will be thoroughly efficient for the purposes designed and will coact in the production of a practical and efficient form of pressure regulators for gas lines.

Having thus described my invention, what I claim is:

1. A pressure regulator comprising a valve casing having a septum disposed therein parallel to its axis, the septum being formed with a port, said valve casing having oppositely disposed rotatively small tubular extensions leading therefrom on opposite sides of said septum in alinement with the port in the septum, a relatively shallow diaphragm chamber mounted on one of said extensions, a diaphragm mounted thereon, a valve coacting with the port and having a valve rod connected with said diaphragm, said valve rod also extending into the other tubular extension, a relatively small diaphragm mounted in the last named tubular extension and preventing the entrance of gas thereinto, a coiled spring operatively connected to the valve rod and housed within the last named tubular extension, and means for tensioning said spring.

2. A pressure regulator comprising a straight valve casing having a septum formed therein extending parallel to the axis thereof, said septum having a valve seat, a flanged extension formed upon said casing on the outlet side thereof, a pan-shaped member detachably mounted on the extension, a diaphragm extending over said pan-shaped member and detachably connected to the edges thereof, a valve within the casing coacting with said valve seat having a rod operatively connecting it to the diaphragm, a tubular member open at its inner end and extending from the casing opposite the tubular extension, said tubular member being detachable from the casing, a coiled spring contained in the tubular member and engaging the valve rod, a relatively small diaphragm disposed across the mouth of said tubular member, the diaphragm being smaller than the valve and protecting the spring from the action of the gas, a longitudinally movable rack mounted upon the tubular member and held from rotatable movement, a gear wheel engaging said rack and having a shaft extending out through said tubular member, and an indicator mounted upon the shaft.

3. In a gas pressure regulator, a valve casing adapted to be connected at opposite ends to a pipe line and having a septum therein provided with a valve opening, a chamber connected to the outlet side of the casing, a diaphragm extending across said chamber and entirely acted upon by the pressure of the gas in the outlet side of the casing, a valve disposed in the casing on the inlet side of the septum and operatively connected to the diaphragm, a chamber extending from the inlet side of the casing, a contractile spring disposed within said last named chamber and operatively connected to the valve, tension adjusting means to which the other end of the spring is connected, and a diaphragm smaller than the valve disposed over the inner end of the spring inclosing tube and preventing the inlet of gas thereinto.

4. In a gas regulator, a valve casing having a straight body opening at its ends and having a septum extending longitudinally through the casing and formed with an opening, said casing at opposite points on its wall and in alinement with said valve opening being formed with openings, a diaphragm chamber mounted upon the casing and having an opening alining with one of said openings in the wall of the casing, a diaphragm mounted upon the chamber, a valve stem extending from said diaphragm through the openings in the chamber, a valve carried by said stem, a relatively small tubular connection extending from the valve casing at a point opposite the opening leading to the diaphragm chamber and detachably connected to the casing, a contractile spring disposed in the tubular member and operatively connected to the valve stem, a diaphragm, smaller than the valve and extending across the tubular member at its junction with the valve casing, and a tensioning device for regulating the tension of said spring, the periphery of the valve and the wall of the opening with which it coacts being reversely inclined to each other.

In testimony whereof I hereunto affix my signature in the presence of two witnesses.

FRED BOYD.

Witnesses:
E. O. HILDEBRAND,
C. T. BOYD.